(12) United States Patent
Chen et al.

(10) Patent No.: US 11,079,720 B2
(45) Date of Patent: Aug. 3, 2021

(54) HOLOGRAPHIC DISPLAY SYSTEM

(71) Applicants: National Taiwan University, Taipei (TW); Himax Technologies Limited, Tainan (TW)

(72) Inventors: Chien-Yu Chen, Taipei (TW); Chih-Hao Chuang, Taipei (TW); Hoang-Yan Lin, Taipei (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 239 days.

(21) Appl. No.: 16/405,857

(22) Filed: May 7, 2019

(65) Prior Publication Data

US 2020/0356051 A1 Nov. 12, 2020

(51) Int. Cl.
*G03H 1/22* (2006.01)
*G03H 1/00* (2006.01)
*G02B 27/01* (2006.01)
*G03H 1/02* (2006.01)

(52) U.S. Cl.
CPC ....... *G03H 1/2202* (2013.01); *G02B 27/0172* (2013.01); *G03H 1/0005* (2013.01); *G02B 2027/0174* (2013.01); *G03H 2001/0216* (2013.01); *G03H 2001/0224* (2013.01); *G03H 2223/22* (2013.01); *G03H 2223/50* (2013.01); *G03H 2225/32* (2013.01); *G03H 2225/60* (2013.01)

(58) Field of Classification Search
CPC ............... G03H 1/2202; G03H 1/0005; G03H 2225/60; G03H 2223/22; G03H 2223/50; G03H 2001/0216; G03H 2001/0224; G03H 2225/32; G03H 1/32; G03H 2001/2284; G03H 1/2294; G03H 2223/54; G03H 1/2205; G03H 1/2286; G02B 27/0172; G02B 2027/0174; G02B 2027/0178; G02B 2027/014; G02B 27/017; G02B 2027/0118; G02B 27/0103; G02B 5/32; G02B 2027/011; G02B 2027/0132; G02B 27/01
USPC ........................................................... 359/13
See application file for complete search history.

(56) References Cited

U.S. PATENT DOCUMENTS

| | | | |
|---|---|---|---|
| 10,571,696 B2 * | 2/2020 | Urey | G06T 11/60 |
| 2012/0188619 A1 * | 7/2012 | Song | G03H 1/2205 |
| | | | 359/9 |
| 2016/0055929 A1 * | 2/2016 | Zhan | G02B 26/06 |
| | | | 250/251 |
| 2017/0020627 A1 * | 1/2017 | Tesar | A61B 90/37 |

* cited by examiner

*Primary Examiner* — Jade R Chwasz
(74) *Attorney, Agent, or Firm* — Donald E. Stout; Stout, Uxa & Buyan, LLP

(57) ABSTRACT

A holographic display system includes a light source that emits coherent light; a lateral displacement beam splitter that optically receives the coherent light and generates first reference light and second reference light; a first spatial light modulator (SLM) and a second SLM that optically receive the first reference light and the second reference light respectively, and construct first phase-only function (POF) light and second POF light respectively; a first beam splitter and a second beam splitter that optically receive the first POF light and the second POF light respectively, and generate first split light and second split light respectively; and a plurality of polarizers disposed between the first SLM and the first beam splitter, and between the second SLM and the second beam splitter, respectively.

16 Claims, 2 Drawing Sheets

HOLOGRAPHIC DISPLAY SYSTEM

BACKGROUND OF THE INVENTION

1. Field of the Invention

The present invention generally relates to a display system, and more particularly to an augmented reality (AR) holographic display system.

2. Description of Related Art

Three-dimensional (3D) display technology has become the mainstream of new-generation display, such as light field, binocular parallax, time-multiplexed, holography and so on, and computer-generated holography is the most ideal. The holographic display records and reconstructs the light information of object including the phase and amplitude in the form of fringe pattern which is generated by interference. In particular, the images produced by holography satisfy physiological requirements of human visual system. But it still has its limits due to speckle problem. As the hologram comes from interference and refraction, the light source must be high coherent light to reconstruct high fidelity image. The speckle problem will emerge from high coherent light, and affect image quality, simultaneously.

SUMMARY OF THE INVENTION

In view of the foregoing, it is an object of the embodiment of the present invention to provide a holographic display system with reduced speckle and enhanced image quality.

According to one embodiment, an augmented reality (AR) holographic display system disposed in a head-mounted display device includes a laser light source, a reflector, a lateral displacement beam splitter, a first spatial light modulator (SLM), a second SLM, a first reflector, a second reflector, a first beam splitter, a second beam splitter, and a plurality of polarizers. The laser light source emits coherent light. The reflector optically receives the coherent light and generates reflection light. The lateral displacement beam splitter optically receives the reflection light and generates first reference light and second reference light. The first SLM and the second SLM that optically receive the first reference light and the second reference light respectively, and construct first phase-only function (POF) light and second POF light respectively. The first reflector is disposed between the lateral displacement beam splitter and the first SLM, and the second reflector is disposed between the lateral displacement beam splitter and the second SLM. The first beam splitter and the second beam splitter optically receive the first POF light and the second POF light respectively, and generate first split light and second split light respectively. The polarizers are disposed between the first SLM and the first beam splitter, between the second SLM and the second beam splitter, between the first reflector and the first SLM, and between the second reflector and the second SLM, respectively.

DETAILED DESCRIPTION OF THE INVENTION

Figure 1:
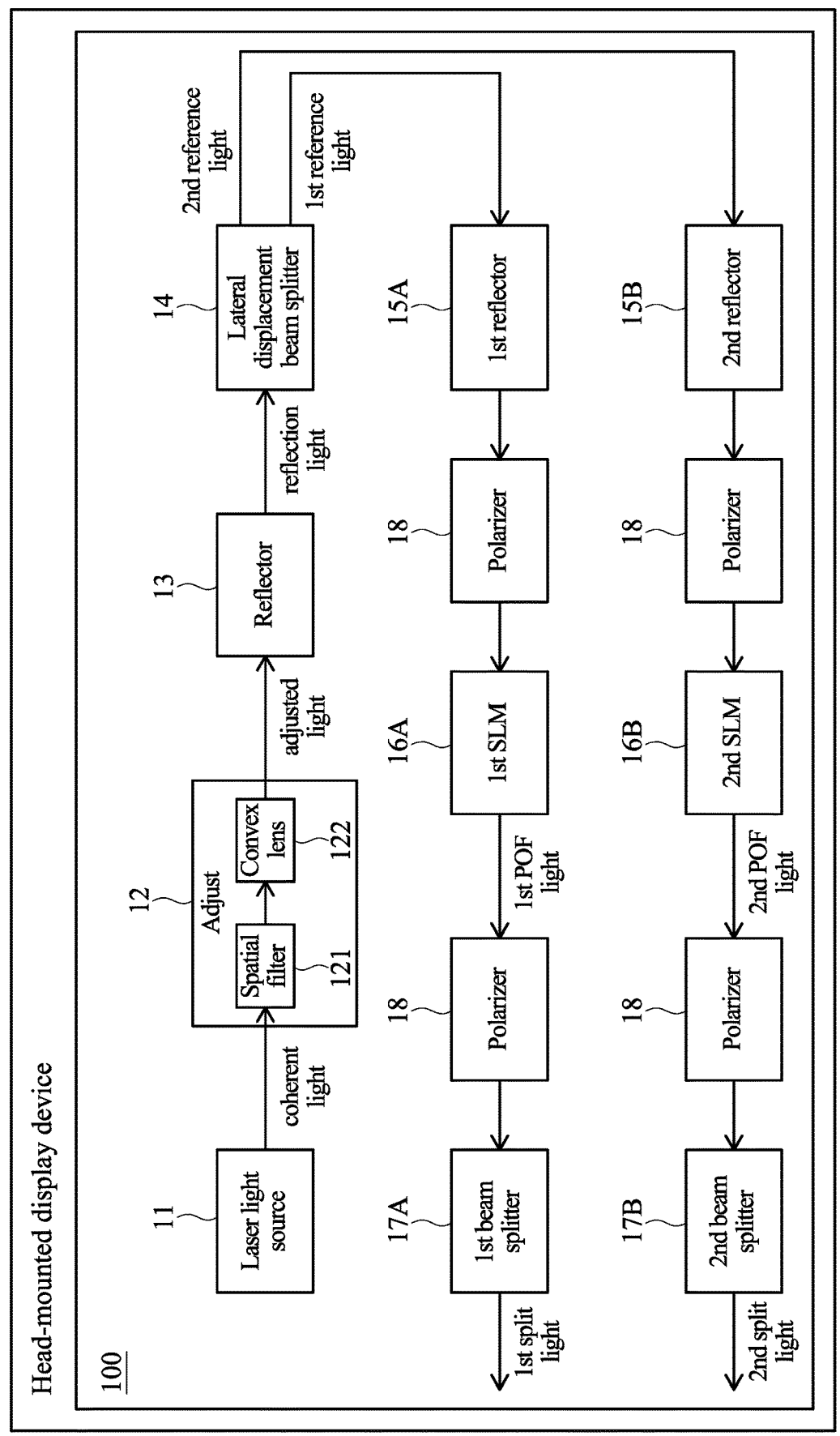
FIG. 1 shows a block diagram illustrating a holographic display system according to one embodiment of the present invention.
Figure 2:
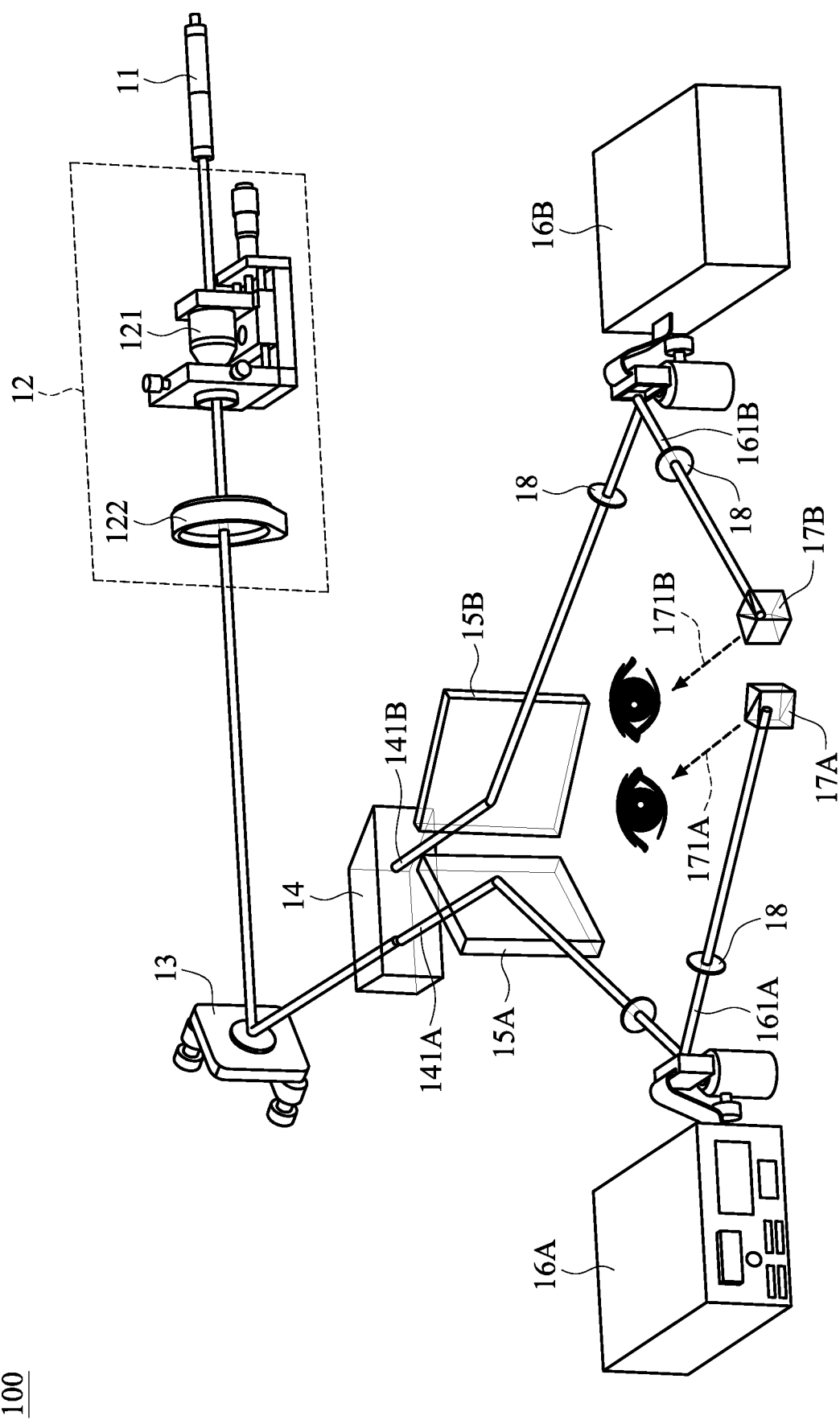
FIG. 2 shows a schematic diagram exemplifying the holographic display system of FIG. 1 according to one embodiment of the present invention.

FIG. 1 shows a block diagram illustrating a holographic display system 100 according to one embodiment of the present invention. FIG. 2 shows a schematic diagram exemplifying the holographic display system 100 of FIG. 1 according to one embodiment of the present invention. In one embodiment, the holographic display system 100 may be applied on, and disposed in, a head-mounted display device with augmented reality (AR) and multi-depth. Accordingly, the holographic image generated by the holographic display system 100 may be diffracted at a distance from and perceived by pupil of a user.

In the embodiment, the holographic display system 100 may include a laser light source 11 configured to emit coherent light. The laser light source 11 may be a monochromatic light source or a full-color light source.

The holographic display system 100 may include an adjust unit 12 configured to adjust the coherent light to plane wave, thereby generating adjusted light. In the embodiment, the adjust unit 12 may include a spatial filter 121 optically coupled to receive the coherent light and configured to generate filtered light by removing aberrations in the coherent light due to imperfectness in the laser light source 11. The adjust unit 12 may include a convex lens 122, such as biconvex lens, optically coupled to receive the filtered light and configured to generate the adjusted light.

The holographic display system 100 may include a reflector 13 optically coupled to receive the adjusted light (from the adjust unit 12) or the coherent light (from the laser light source 11 if the adjust unit 12 is omitted), and configured to generate reflection light.

The holographic display system 100 may include a lateral displacement beam splitter 14 optically coupled to receive the reflection light (from the reflector 13) or the adjusted light (from the adjust unit 12 if the reflector 13 is omitted) or the coherent light (from the laser light source 11 if the reflector 13 and the adjust unit 12 are omitted), and configured to generate first reference light 141A and second reference light 141B by separating light.

The holographic display system 100 may include a first spatial light modulator (SLM) 16A and a second SLM 16B optically coupled to receive the first reference light 141A and the second reference light 141B respectively, and configured to construct first phase-only function (POF) light 161A (such as computer-generated POF or CGPOF) and second POF light 161B (such as CGPOF) respectively. In one embodiment, a first reflector 15A may be further disposed between the lateral displacement beam splitter 14 and the first SLM 16A, and a second reflector 15B may be further disposed between the lateral displacement beam splitter and the second SLM 16B. In one embodiment, modified Gerchberg-Saxton algorithm (MGSA) that utilizes point-based Fresnel transform may be adopted to compile information of 3D object. In comparison with Gerchberg-Saxton algorithm (GSA), the random number generated phase signal is considered as the initial phase signal in MGSA. Based on the encryption and decryption of signals, the security level would be significantly improved. Instead of Fourier transform, Fresnel transform is adopted for the purpose of lensless optical reconstruction structure, and the cost and complexity may be reduced.

The holographic display system 100 may include a first beam splitter 17A (e.g., cube beam splitter) and a second beam splitter 17B (e.g., cube beam splitter) optically coupled to receive the first POF light 161A and the second POF light 161B respectively, and configured to generate first split light 171A and second split light 171B respectively. The first split light 171A and the second split light 171B may be diffracted at a distance from pupils of eyes of the user, and a 3D image may be perceived by the user.

According to one aspect of the embodiment, polarizers 18 (e.g., linear polarizer) may be disposed between the first SLM 16A and the first beam splitter 17A, and between the second SLM 16B and the second beam splitter 17B respectively, and configured to reduce speckle (such as zero-order noise) for substantially improving image quality. In one embodiment, polarizers 18 (e.g., linear polarizer) may further be disposed between the first reflector 15A and the first SLM 16A, and between the second reflector 15B and the second SLM 16B respectively, and configured to reduce speckle for substantially improving image quality. Specifically, the polarizer is an optical device capable of passing light waves of a specific polarization while unwanted blocking light waves of other polarizations.

Although specific embodiments have been illustrated and described, it will be appreciated by those skilled in the art that various modifications may be made without departing from the scope of the present invention, which is intended to be limited solely by the appended claims.

What is claimed is:

1. A holographic display system, comprising:
a light source that emits coherent light;
a lateral displacement beam splitter that optically receives the coherent light and generates first reference light and second reference light;
a first spatial light modulator (SLM) and a second SLM that optically receive the first reference light and the second reference light respectively, and construct first phase-only function (POF) light and second POF light respectively;
a first beam splitter and a second beam splitter that optically receive the first POF light and the second POF light respectively, and generate first split light and second split light respectively; and
a first polarizer disposed between the first SLM and the first beam splitter, and a second polarizer disposed between the second SLM and the second beam splitter.

2. The system of claim 1, wherein the light source comprises a laser light source.

3. The system of claim 1, further comprising:
an adjust unit disposed between the light source and the lateral displacement beam splitter, the adjust unit adjusting the coherent light to plane wave, thereby generating adjusted light.

4. The system of claim 3, wherein the adjust unit comprises a spatial filter that optically receives the coherent light and generates filtered light by removing aberrations in the coherent light.

5. The system of claim 4, wherein the adjust unit comprises a convex lens that optically receives the filtered light and generates the adjusted light.

6. The system of claim 1, further comprising:
a reflector disposed between the light source and the lateral displacement beam splitter, the reflector optically receiving the coherent light and generating reflection light, which is optically received by the lateral displacement beam splitter.

7. The system of claim 1, further comprising:
a first reflector disposed between the lateral displacement beam splitter and the first SLM; and
a second reflector disposed between the lateral displacement beam splitter and the second SLM.

8. The system of claim 1, further comprising a third polarizer disposed between the lateral displacement beam splitter and the first SLM, and a fourth polarizer disposed between the lateral displacement beam splitter and the second SLM.

9. The system of claim 1, wherein the first beam splitter and the second beam splitter comprise cube beam splitters.

10. The system of claim 1, wherein the first polarizer and the second polarizer each comprise a linear polarizer.

11. An augmented reality (AR) holographic display system disposed in a head-mounted display device, the system comprising:
a laser light source that emits coherent light;
a reflector that optically receives the coherent light and generates reflection light;
a lateral displacement beam splitter that optically receives the reflection light and generates first reference light and second reference light;
a first spatial light modulator (SLM) and a second SLM that optically receive the first reference light and the second reference light respectively, and construct first phase-only function (POF) light and second POF light respectively;
a first reflector disposed between the lateral displacement beam splitter and the first SLM;
a second reflector disposed between the lateral displacement beam splitter and the second SLM;
a first beam splitter and a second beam splitter that optically receive the first POF light and the second POF light respectively, and generate first split light and second split light respectively; and
a first polarizer disposed between the first SLM and the first beam splitter, a second polarizer disposed between the second SLM and the second beam splitter, a third polarizer disposed between the first reflector and the first SLM, and a fourth polarizer disposed between the second reflector and the second SLM.

12. The system of claim 11, further comprising:
an adjust unit disposed between the laser light source and the reflector, the adjust unit adjusting the coherent light to plane wave, thereby generating adjusted light.

13. The system of claim 12, wherein the adjust unit comprises a spatial filter that optically receives the coherent light and generates filtered light by removing aberrations in the coherent light.

14. The system of claim 13, wherein the adjust unit comprises a convex lens that optically receives the filtered light and generates the adjusted light.

15. The system of claim 11, wherein the first beam splitter and the second beam splitter comprise cube beam splitters.

16. The system of claim 11, wherein the first polarizer, the second polarizer, the third polarizer and the fourth polarizer each comprise a linear polarizer.

* * * * *